(12) United States Patent
Schmitt et al.

(10) Patent No.: US 11,355,799 B2
(45) Date of Patent: Jun. 7, 2022

(54) COOLING PLATE FOR THE TEMPERATURE CONTROL OF AT LEAST ONE BATTERY CELL AND A BATTERY SYSTEM

(71) Applicant: Robert Bosch GmbH, Stuttgart (DE)

(72) Inventors: Markus Schmitt, Tamm (DE); Andreas Ruehle, Bietigheim-Bissingen (DE); Benjamin Kopp, Remseck Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 16/587,145

(22) Filed: Sep. 30, 2019

(65) Prior Publication Data

US 2020/0106146 A1 Apr. 2, 2020

(30) Foreign Application Priority Data

Sep. 28, 2018 (DE) .......................... 102018216708.7

(51) Int. Cl.
| | |
|---|---|
| H01M 10/6556 | (2014.01) |
| F28D 21/00 | (2006.01) |
| F28F 3/04 | (2006.01) |
| H01M 10/613 | (2014.01) |

(52) U.S. Cl.
CPC ..... H01M 10/6556 (2015.04); H01M 10/613 (2015.04)

(58) Field of Classification Search
CPC ........... H01M 10/6556; H01M 10/613; H01M 10/325; H01M 10/3554; H01M 10/3567; H01M 50/20; F28F 2255/02; F28F 3/044; F28F 3/12; F28D 2021/0029; F28D 1/03; Y02E 60/10
See application file for complete search history.

(56) References Cited

U.S. PATENT DOCUMENTS

| | | | | |
|---|---|---|---|---|
| 3,250,325 A | * | 5/1966 | Eugenee ................. | F28F 1/128 165/153 |
| 5,036,911 A | * | 8/1991 | So .......................... | F28F 3/044 165/153 |
| 5,205,348 A | * | 4/1993 | Tousignant ............... | F28F 3/12 165/170 |

(Continued)

FOREIGN PATENT DOCUMENTS

| | | | | |
|---|---|---|---|---|
| DE | 102014202535 A1 | * | 8/2015 | .......... H01M 10/625 |
| DE | 112015002995 | | 3/2017 | |
| DE | 102017210343 | | 12/2018 | |

OTHER PUBLICATIONS

Machine translation of DE102014202535 originally published to Hendrix on Aug. 13, 2015. (Year: 2015).*

*Primary Examiner* — Christian Roldan

(74) *Attorney, Agent, or Firm* — Michael Best & Friedrich LLP

(57) ABSTRACT

A cooling plate (10) for the temperature control of at least one battery cell, especially for a traction battery, comprising a frame (12) with flow ducts (16) designed for the flowing of a coolant through them and a flexibly configured cover (14), which bounds the flow ducts (16) in fluid-tight manner and is provided for the thermal contacting of the at least one battery cell. It is proposed that the flow ducts (16) comprise at least one perturbing contour (28), which is provided to increase the turbulence in the coolant flowing through the flow ducts (16).

17 Claims, 3 Drawing Sheets

(56) References Cited

U.S. PATENT DOCUMENTS

| | | | |
|---|---|---|---|
| 5,538,700 A * | 7/1996 | Koves | B01J 8/0285 |
| | | | 165/166 |
| 2008/0128113 A1 | 6/2008 | Tomioka | |
| 2010/0032150 A1* | 2/2010 | Determan | F28D 15/0266 |
| | | | 165/246 |
| 2017/0176108 A1 | 6/2017 | Palanchon et al. | |
| 2018/0106558 A9* | 4/2018 | Buckrell | F28D 21/0015 |
| 2021/0025661 A1* | 1/2021 | Suzuki | F28D 9/0031 |

* cited by examiner

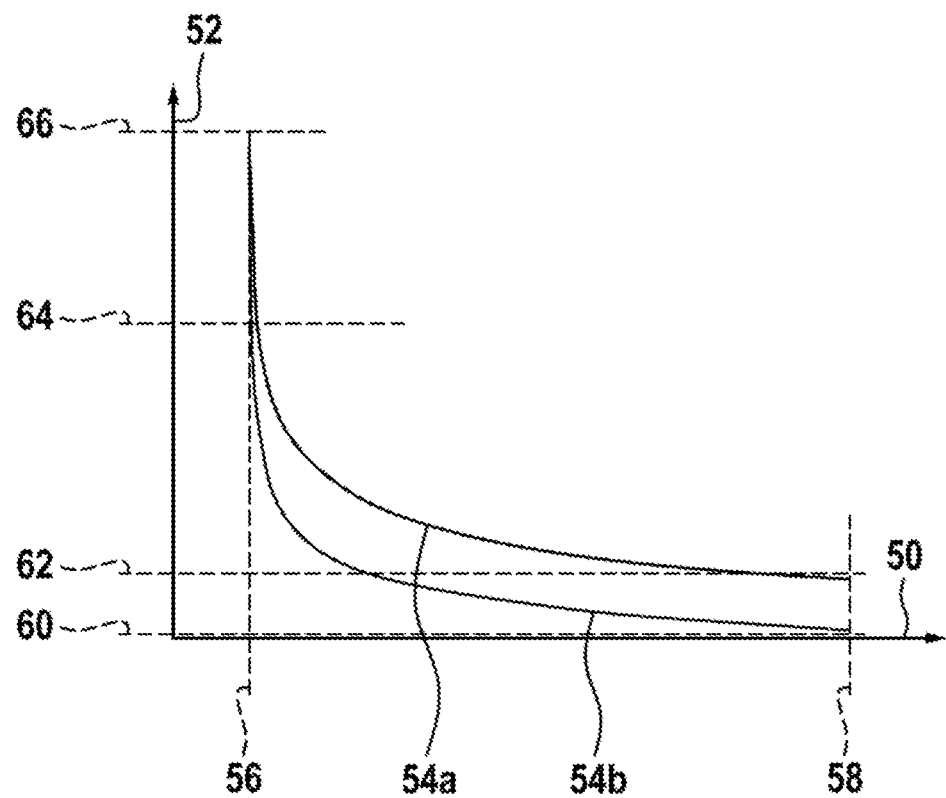

COOLING PLATE FOR THE TEMPERATURE CONTROL OF AT LEAST ONE BATTERY CELL AND A BATTERY SYSTEM

BACKGROUND OF THE INVENTION

The invention relates to a cooling plate for the temperature control of at least one battery cell. Furthermore, the invention also relates to a battery system with such a cooling plate.

Cooling plates are known from EP0516280A1 for the temperature control of traction battery cells, having flow ducts covered by a flexible cover for the thermal contacting of the traction battery. Such cooling plates have the drawback that a reliable temperature control of the traction battery cells is not always possible.

SUMMARY OF THE INVENTION

The present invention describes a cooling plate for the temperature control of at least one battery cell, especially for a traction battery. The cooling plate comprises a frame with flow ducts designed for the flowing of a coolant through them and a flexibly configured cover. The flexibly configured cover bounds the flow ducts in fluid-tight manner and is provided for the thermal contacting of the at least one battery cell. According to the invention, the flow ducts comprise at least one perturbing contour, which is provided to increase the turbulence in the coolant flowing through the flow ducts. This has the benefit of improved cooling performance or temperature control ability as compared to the prior art. The increased turbulence which can be produced by means of the perturbing contours serves for more intense mixing of the coolant. In particular, a laminar flow formed by the coolant within the flow ducts, especially a laminar flow formed along a longitudinal direction of the flow ducts, is disrupted such that a temperature gradient perpendicular to the longitudinal direction is minimized. The perturbing contour produces for example a turbulent flow with eddy currents in the coolant. Preferably, the perturbing contour produces for example a flow with a Reynolds number over 100, preferably over 1000, especially preferably over 2000.

The cooling plate preferably comprises a first port, which is provided for a supply of the coolant. The cooling plate preferably comprises a second port, which is provided for a drainage or an outflow of the coolant. Especially preferably, the frame comprises the first port. Especially preferably, the frame comprises the second port. This has the benefit that the cooling plate is especially reliable and robust, especially being leakproof or tight.

By a coolant is meant especially preferably a liquid coolant. Preferably, the coolant comprises a mixture of water and glycol. Of course, however, other embodiments are possible with coolants comprising gases and/or aerosols.

The frame preferably comprises a plate, especially a plate formed largely rectangular. Preferably, the frame and/or the plate is formed at least partly from plastic. The geometry of the plate or the geometry of the cooling plate will depend in particular on the geometry of the battery cell being cooled, especially a dimension of the battery cell being cooled, so that the battery cell can be thermally contacted by the cooling plate. Preferably, the cooling plate or the plate is flat or largely flat. A flat cooling plate is provided for the thermal contacting on a flat side surface of the battery cell. It is also conceivable for the cooling plate or the plate to have a curvature. This has the advantage that an especially good thermal contacting of the battery cell is possible. In addition, it has the advantage that an especially stable and reliable mechanical contacting or connection between the battery cell and the cooling plate is possible.

The frame comprises flow ducts. By a flow duct is meant in particular a conduit formed for a coolant to flow through it, being especially elongated in shape. In particular, it should be understood that the flow duct has a much larger extension in a longitudinal direction than in a direction situated perpendicular to the longitudinal direction. In particular, a diameter of a flow cross section area of the flow duct oriented perpendicular to the longitudinal direction is significantly smaller than a length of the flow duct along the longitudinal direction. By a significantly greater first length than a second length is meant that the first length is larger by at least a factor of 10 than the second length, preferably by a factor of 20, especially preferably by a factor of 40. By a significantly smaller first length than a second length is meant that the first length is smaller by at least a factor of 10 than the second length, preferably by a factor of 20, especially preferably by a factor of 40.

In particular, a flow duct is formed open for at least a portion along its longitudinal direction. Preferably, openings or open areas of the flow duct are positioned such that they lie against the battery cell in the condition when mounted on the battery cell. In particular, it is conceivable that the openings or open areas of the flow ducts are arranged at least for a portion perpendicular or largely perpendicular to a normal to the cooling plate. By a first axis being arranged largely perpendicular to a second axis is meant that the first axis makes an angle with the second axis deviating not more than 8°, advantageously not more than 5°, especially advantageously not more than 2° from 90°.

Preferably, a flow duct each time comprises two webs arranged on the frame and/or preferably on the plate. Preferably, the webs run at least largely parallel to each other. Preferably, the two webs are in contact with the frame and/or with the plate in fluid-tight manner. In particular, a coolant flowing through the flow duct is bounded in fluid-tight manner by the webs and the frame or the plate. A web is a boundary wall of a flow duct. By a first axis being arranged largely parallel to a second axis is meant that the first axis makes an angle with the second axis deviating not more than 8°, advantageously not more than 5°, especially advantageously not more than 2° from 0°.

The flexibly configured cover is designed to bound the flow ducts in fluid-tight manner. In particular, the flexibly configured cover is designed to bound the open area or the open areas of a flow duct in fluid-tight manner. For example, the flexibly configured cover may contact the webs of a flow duct in fluid-tight manner, so that a coolant flowing through the flow duct is bounded by the webs, the flexibly configured cover and the frame or the plate in fluid-tight manner. This has the benefit of making possible an especially good temperature control of the battery cell, since heat can be transferred especially well between the battery cell and the coolant by the flexibly configured cover. In particular, the use of a sufficiently thin flexibly configured cover is possible, so that this has an especially slight thermal resistance.

By a flexibly configured cover is meant in particular a cover which is elastically or at least partly elastically deformable. In particular, a flexibly configured cover is deformable by a force acting upon it and designed to return at least partly to its original shape when the force goes away. A flexibly configured cover can be placed or flattened especially well against the at least one battery cell, especially to make thermal contact. This enables a more efficient cooling of the battery cell.

Preferably the frame comprises a plurality of flow ducts, preferably between 4 and 16 flow ducts, especially preferably between 8 and 12 flow ducts. The number of flow ducts depends in particular on the geometry of the battery cell being cooled, especially a dimension of the battery cell being cooled.

By a longitudinal direction of the flow duct is meant in particular a direction of principal lengthwise extension of the flow duct, preferably pointing in an intended direction of flow of the coolant and/or in a mean intended direction of flow of the coolant. By a longitudinal direction of the flow duct is meant in particular a mean direction over the respective longitudinal directions of the individual flow ducts. Preferably, all or nearly all of the flow ducts have the same or largely the same longitudinal direction.

Preferably, the cooling plate is made as a single piece with the frame. By a single piece is meant in this context in particular materially bonded, such as by a welding process and/or a gluing process, etc., and especially advantageously one which is molded on, such as by being made from a casting and/or being made in a single or multiple component injection molding process. Preferably, the cooling plate is formed as a single piece with the first port and/or the second port. This has the advantage that the cooling plate has a high mechanical stability.

Preferably, the frame comprises the first port and/or the second port. Preferably, the frame is formed as a single piece with the flow ducts and/or the first port and/or the second port. Preferably, at least one web of one flow duct is formed as a single piece with the frame and/or with the plate of the frame.

By a perturbing contour is meant in particular an element or component which changes a flow cross section area of a flow duct for a portion, especially one which reduces it. The perturbing contour is designed to disrupt a laminar flow through the flow duct, in particular to heighten the turbulence of the flow. Preferably, the perturbing contour is formed as a single piece with the frame and/or with the plate and/or with a web. For example, the perturbing contour may be formed as an extension of the frame and/or the plate and/or a web.

If the at least one perturbing contour deflects the coolant flowing through the flow duct at least partly in the direction toward the flexibly configured cover, the coolant will be mixed in the direction of the flexibly configured cover. In this way, a forming of laminar flow layers in the coolant is prevented. The coolant can take up a larger quantum of heat per unit of time and surface, so that a possible temperature control performance of the cooling plate is enhanced.

In one advantageous variant, a contour height of the at least one perturbing contour situated perpendicular to a longitudinal direction of the flow ducts increases at least for a portion along the longitudinal direction of the flow ducts. In this way, the turbulence can be increased in the coolant flowing through the flow ducts, without increasing the flow resistance too much. By selecting how quickly or greatly the contour height rises along the longitudinal direction, especially by selecting a gradient of the contour height, one can adjust the degree of turbulence and/or the flow resistance. The selection of how quickly or greatly the contour height rises along the longitudinal direction depends in particular on the technical requirements for the cooling plate, especially the requirements on temperature control performance, especially the cooling performance, and/or the requirements on the flow resistance of the cooling plate for the coolant.

A cooling plate in which the perturbing contour has a triangular cross section area parallel to the longitudinal direction is an especially easily produced variant of a cooling plate. Preferably, the triangular cross section area is formed as a right triangle. Preferably, the perturbing contour is arranged such that a first cathetus of the triangular cross section area is arranged parallel or largely parallel to the longitudinal direction. Especially preferably, the perturbing contour is arranged such that a second cathetus of the triangular cross section area is arranged perpendicular or largely perpendicular to the flexibly configured cover and/or the second cathetus is arranged parallel or largely parallel to a normal to the cooling plate.

Because a plurality of first perturbing contours in a respective flow duct are arranged in a first row along a longitudinal direction of the respective flow duct and a plurality of second perturbing contours in the respective flow duct are arranged in a second row along the longitudinal direction of the respective flow duct, a more even increasing of the turbulence across the entire cooling plate becomes possible. Preferably, the plurality of first perturbing contours in the first row are arranged uniformly or equidistant. Preferably, the plurality of second perturbing contours in the second row are arranged uniformly or equidistant. It is conceivable in variants for a further row or more than one further row to be arranged along the longitudinal direction of the respective flow duct each with a plurality of perturbing contours. This further enhances the uniformity of the turbulence increase.

If the second perturbing contours of the second row are offset from the first perturbing contours of the first row, this has the advantage that coolant flowing through the flow duct is deflected additionally in a direction which connects the first row to the second row. In particular, the coolant flowing through the flow duct is deflected additionally in a direction perpendicular to the longitudinal direction and parallel to the flexibly configured cover. For example, in this way it is possible for a flow of the coolant flowing through the flow duct to run largely along a zig zag line. In this way, the turbulence is further increased in the coolant flowing through the flow duct, so that the temperature control ability of the cooling plate can be further improved.

Especially advantageous for increasing the turbulence is a cooling plate in which each time four perturbing contours of a plurality of perturbing contours form a parallelogram. By four perturbing contours forming a parallelogram is meant that the four perturbing contours are arranged at the corners of an imaginary parallelogram. Especially advantageous is a parallelogram having an internal angle less than 90°.

The cooling plate is further improved when the flexibly configured cover comprises at least one film, preferably a plurality of films, especially one formed as a composite film. In this way, a good heat transfer between the coolant and the battery cell is assured for an especially durable seal of the flow ducts.

If the flexibly configured cover is materially bonded to the frame, especially with two webs bordering on a respective flow duct, this has the advantage that the fluid-tight sealing of the flow ducts by the flexibly configured cover is especially secure and reliable. By a materially bonded connection is meant in particular a connection by a sealing process, especially a hot sealing process. Preferably, a materially bonded connection may be a glue connection, a connection by vulcanization, a welded connection—especially a laser welded connection—and/or a soldered connection.

A battery system comprising a cooling plate according to the present invention and a battery module, wherein the battery module comprises at least one battery cell and the at least one battery cell is arranged on the flexibly configured cover so that a thermal contacting of the at least one battery cell and the flexibly configured cover is formed, has the advantage that the battery module has an especially good anticipated service life on account of the fact that the cooling plate can always provide the necessary cooling power.

BRIEF DESCRIPTION OF THE DRAWINGS

The drawings show exemplary embodiments of the cooling plate according to the present invention, which are explained more closely in the following description. There are shown FIG. 1, a first embodiment of a cooling plate according to the present invention, FIG. 2, the first embodiment of the cooling plate according to the present invention without a flexibly configured cover, FIG. 3, a cutout of the first embodiment of the cooling plate without the flexibly configured cover in a detail view, FIG. 4, a flow duct of the cooling plate in a cross sectional view, and FIG. 5, a plot of the heat transfer coefficient against the duct length.

DETAILED DESCRIPTION

In the various variant embodiments, the same parts are given the same reference numbers.

Figure 1:
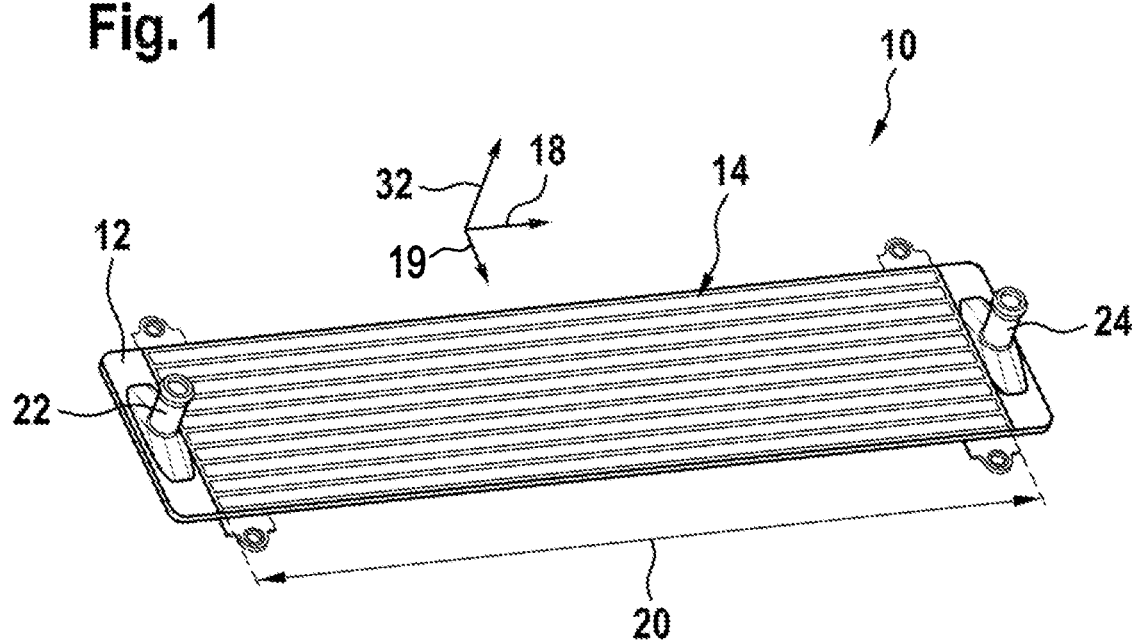

FIG. 1 shows in a perspective view one embodiment of a cooling plate 10 according to the invention for the temperature control of at least one battery cell.

The cooling plate 10 comprises a frame 12. The frame in the exemplary embodiment shown in FIG. 1 is made of plastic. The cooling plate 10 comprises a flexibly configured cover 14. The frame 12 comprises flow ducts 16. The flow ducts 16 are covered or closed off by the flexibly configured cover 14. In particular, the flow ducts 16 are closed off by the flexibly configured cover 14 from the outer surroundings.

Figure 2:
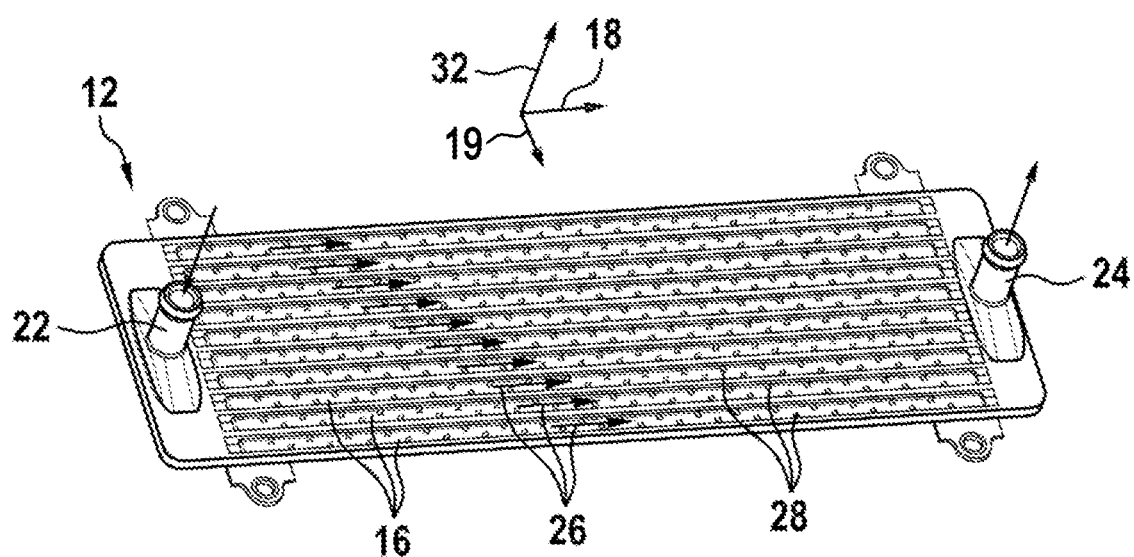

FIG. 2 shows a perspective view of the frame 12 without the flexibly configured cover 14 in order to reveal the flow ducts 16. The flow ducts 16 are oriented each time along a longitudinal direction 18. In the exemplary embodiment shown in FIG. 2, the frame 12 comprises for example ten flow ducts 16. The flow ducts 16 are each defined in part by a planar flow duct surface 17. The flow ducts 16 each have for example a flow duct length 20 of 40 cm. In alternative embodiments, the value of the flow duct length 20 will depend on the technical requirements, especially the dimensions of the battery cell, such as its dimensions. The flow duct length 20 in particular may be between 10 cm and 80 cm, preferably between 20 cm and 60 cm, especially preferably between 30 cm and 50 cm.

The frame 12 has for example a first port 22, which is designed to supply a coolant. The frame 12 has for example a second port 24, which is designed for the drainage or outflow of the coolant. FIG. 2 illustrates an intended flow profile of the coolant during the operation of the cooling plate 10.

The coolant flows through the first port 22 into the cooling plate 10.

Next, the coolant flows through the flow ducts 16. Within a flow duct 16, the coolant flows each time along a mean flow direction 26. The mean flow direction 26 is situated parallel to the longitudinal direction 18. The mean flow direction 16 denotes in particular a flow direction of the coolant averaged over time and/or over a flow cross section area of the flow duct. The coolant then flows through the second port 24 and out from the cooling plate 10.

Figure 3:
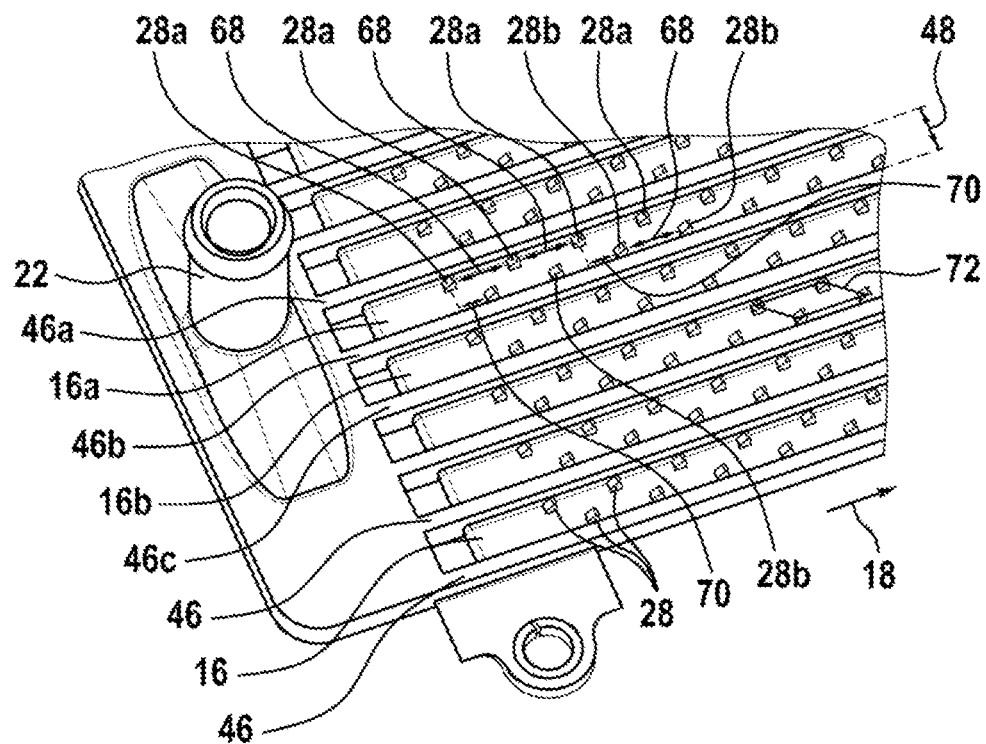

FIG. 3 shows in a perspective view a cutout of the frame 12 of FIG. 2. The flow ducts 16 comprise perturbing contours 28. The perturbing contours 28 are arranged inside the flow ducts 16, so that coolant flowing through the flow ducts 16 can be disturbed by means of the perturbing contours 28 so that for example the turbulence of the coolant can be increased.

Figure 4:
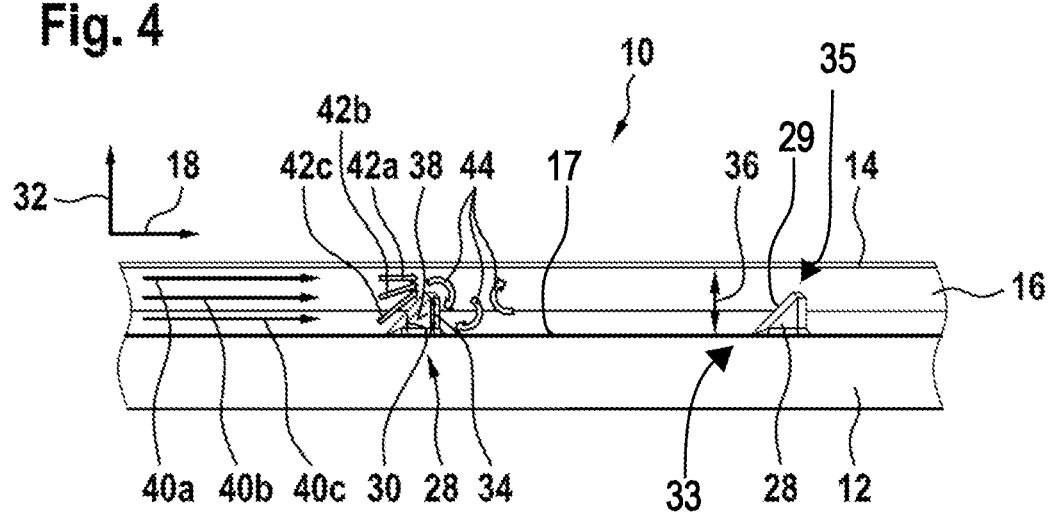

FIG. 4 shows a cross sectional representation of a cooling plate 10 in a detail view. A contour height 30 of a perturbing contour 28 increases respectively along the longitudinal direction 18. The perturbing contour 28 extends from the flow duct surface 17. The perturbing contour 28 has an upper planar surface 29 facing the flexible cover 14 and facing opposite the flow direction 26 such that coolant flowing in the flow direction 26 is deflected by the upper surface 29. The upper surface 29 forms an oblique angle with the flow duct surface 17 and defines the contour height 30. The upper surface 29 also defines an upper edge 35 and a lower edge 33. The upper surface 29 intersects the flow duct surface 17 at the lower edge 33. The upper edge 35 and the lower edge 33 are each linear and elongated in a width direction 19 perpendicular to the contour height 30 and to the longitudinal direction 18. The upper surface 29 has, at the lower edge 33, a maximum width in the width direction 19.

The contour height 30 should be situated perpendicular to the longitudinal direction 18. The contour height 30 furthermore should be arranged parallel to a normal 32 to the cooling plate. The normal to the cooling plate should be arranged perpendicular to the cooling plate 10. The normal to the cooling plate points from the frame 12 in the direction of the elastically configured cover 14 or in the direction of the battery cell in a condition mounted on the battery cell, as can also be seen in FIGS. 1 and 2.

The contour height 30 increases in linear manner in the exemplary embodiment shown in FIG. 4 for example up to a maximum contour height 34 in the longitudinal direction 18. The maximum contour height 34 of a perturbing contour 28 is the largest contour height 30 of the perturbing contour 28. In the exemplary embodiment of FIG. 4, the maximum contour height 34 amounts to 1.5 mm, for example. In other possible variant embodiments of the exemplary embodiment shown, the maximum contour height 34 is between 0.3 mm and 3.0 mm, preferably between 0.5 mm and 2.5 mm, especially preferably between 1.0 mm and 2.0 mm. Preferably, the maximum contour height 34 is chosen in dependence on the technical requirements, especially a geometry—for example a dimension—of the cooling plate 10, preferably a geometry of the frame 12, especially preferably a geometry of the flow ducts 16, and/or the requirements on a temperature control performance, especially the cooling performance, and/or the requirements on a flow resistance of the cooling plate 10 for the coolant.

It is conceivable for the maximum contour height 34 to constitute a fraction of a duct depth 36. The duct depth 36 is arranged parallel to the normal to the cooling plate 32 or a value of the duct depth 36 is determined or measured along the normal to the cooling plate 32. In the exemplary embodiment, the duct depth 36 amounts to 2.0 mm. The maximum contour height 34 amounts to 75% of the duct depth 36. In variants, the maximum contour height 34 is between 20% and 80% of the duct depth 36, in advantageous variants between 35% and 65%, in especially advantageous variants between 45% and 55%, especially 50%.

A cross section area 38 of a perturbing contour 28 is preferably triangular in shape in the exemplary embodiment.

The cross section area 38 is arranged parallel to the longitudinal direction 18. The cross section area 38 is arranged parallel to the normal to the cooling plate 32. In FIG. 4, the cross section area 38 lies in the plane of the drawing.

In the exemplary embodiment, the perturbing contour 28 is configured such that a coolant flowing through the flow duct 16 is deflected at least partly in the direction of the flexibly configured cover 14. In particular, the coolant should be deflected by the perturbing contour 28 at least partly in the direction of the normal to the cooling plate 32. FIG. 4 illustrates schematically a flow of the coolant. The arrows 40a, 40b and 40c respectively illustrate an initial flow direction 40a, 40b and 40c of three flow layers of coolant arranged one on top of another. A top flow layer with the initial flow direction 40a is arranged at the flexibly configured cover 14. A middle flow layer with the initial flow direction 40b is arranged beneath the top flow layer. Beneath here means an arrangement relative to the normal to the cooling plate 32 or opposite to the direction of the normal to the cooling plate 32. A bottom flow layer with the initial flow direction 40c is arranged beneath the middle flow layer. The flow directions 40a, 40b and 40c are each situated parallel to the longitudinal direction 18, before the coolant strikes against the perturbing contour 28. Once the coolant strikes against the perturbing contour 28, the flow is deflected in the direction of the flexibly configured cover 14. The flow directions 42a, 42b and 42c on the perturbing contour 28 each point partly in the direction of the normal to the cooling plate 32.

The middle flow layer is deflected more strongly in the direction of the normal to the cooling plate 32 than the top flow layer. The bottom flow layer is deflected more strongly in the direction of the normal to the cooling plate 32 than the middle flow layer. The fact that a first flow layer is deflected more strongly than a second flow layer in the direction of the normal to the cooling plate 32 means in particular that a first flow direction of the first flow layer at the perturbing contour 28 has a larger component or vector component in the direction of the normal to the cooling plate 32 than a second flow direction of the second flow layer at the perturbing contour 28.

The perturbing contour 28 narrows a flow cross section area of the flow duct 16. A flow velocity of the coolant is increased at the perturbing contour 28. Once the coolant has flowed past the perturbing contour 28, the flow cross section area increases abruptly and the flow velocity decreases. This results in the forming of eddies 44 or turbulence in the flow and a mixing of the flow layers. On the whole, this can increase the Reynolds number such that a turbulent flow can be formed. A laminar flow is disrupted and a temperature gradient is minimized in the direction of the normal to the cooling plate 32. In this way, a possible heat transfer is improved in the direction of the normal to the cooling plate 32.

FIG. 5 shows a plot of a heat transfer coefficient along a flow duct 16a (see FIG. 3). On an abscissa axis 50, a length position is plotted along the longitudinal direction 18 of the flow duct 16a. An ordinate axis 52 plots a value of the heat transfer coefficient. A first curve 54a illustrates the variation of the heat transfer coefficient along the flow duct 16a in the exemplary embodiment. A starting position 56 of a duct length on the abscissa axis 50 has the value of 0 mm. An end position 58 of the duct length on the abscissa axis has the value of 400 mm. A first coefficient value 60 of the heat transfer coefficient on the ordinate axis 52 has the value of 500 W/m^2/K. The heat transfer coefficient has units of Watt per square meter and per Kelvin. A second coefficient value 62 of the heat transfer coefficient on the ordinate axis 52 has the value of 800 W/m^2/K. A third coefficient value 64 of the heat transfer coefficient on the ordinate axis 52 has the value of 2000 W/m^2/K. A fourth coefficient value 66 of the heat transfer coefficient on the ordinate axis 52 has the value of 3000 W/m^2/K. A second curve 54b shows for comparison the variation of the heat transfer coefficient along a flow duct in one variant of the cooling plate 10, which largely corresponds to the cooling plate 10 of the exemplary embodiment and by contrast with the exemplary embodiment has no perturbing contours 28. The heat transfer coefficient of the cooling plate 10 of the exemplary embodiment is significantly increased along the entire longitudinal direction 18 of the cooling plate 10 as compared to the cooling plate 10 of the variant without perturbing contours 28.

In the exemplary embodiment, the flow ducts 16 are bounded for example by two webs 46 (see FIG. 3). The first flow duct 16a is bounded by a first web 46a and a second web 46b. A second flow duct 16b immediately adjacent to the first flow duct 16a is bounded by the second web 46b and a third web 46c. The webs 46 are each arranged parallel to the longitudinal direction 18. Two webs 46 immediately adjacent to each other, for example the first web 46a and the second web 46b, have each time the spacing of a duct width 48 from each other. In the exemplary embodiment, the duct width 48 amounts to 10.0 mm, for example. In alternative embodiments, the value of the duct width 48 depends on the technical requirements, especially on dimensioning—such as a measurement—of the battery cell. Preferably the value of the duct width 48 depends on the requirements for a temperature control performance, especially a cooling performance, and/or the requirements for a flow resistance of the cooling plate 10 for the coolant.

A plurality of first perturbing contours 28a are arranged in the flow duct 16a for example in a first row along the longitudinal direction 18. A plurality of second perturbing contours 28b are arranged in the flow duct 16a for example in a second row along the longitudinal direction 18. In the exemplary embodiment, the first row is arranged for example on the first web 46a. The first perturbing contours 28a each have a spacing of for example 1.5 mm from the first web 46a. The second row is arranged for example on the second web 46b. The second perturbing contours 28b each have a spacing of for example 1.5 mm from the second web 46b.

In the exemplary embodiment, the first perturbing contours 28a are arranged within the first row, for example being equidistant. The first perturbing contours 28a within the first row each time have the same contour row spacing 68 with respect to their closest first perturbing contours 28a of the first row. In the exemplary embodiment, the contour row spacing 68 amounts to 2.0 cm, for example. In alternative embodiments, the value of the contour row spacing 68 depends on the technical requirements, especially a dimensioning of the battery cell and/or a dimensioning—such as a length—of the flow ducts 16. Preferably, the value of the contour row spacing 68 depends on the requirements for a temperature control performance, especially a cooling performance, and/or the requirements on a flow resistance of the cooling plate 10 for the coolant. In the exemplary embodiment, the second perturbing contours 28b within the second row are arranged equidistant, for example. The second perturbing contours 28b within the second row have each time the contour row spacing 68 with respect to their closest second perturbing contours 28b of the second row.

In the exemplary embodiment, the second perturbing contours 28b of the second row are offset by an offset length 70 from the first perturbing contours 28a of the first row. The offset length 70 is in particular a distance along the longitudinal direction 18 between a first perturbing contour 28a and the closest second perturbing contour 28b or a projection of a distance between a first perturbing contour 28a and the closest second perturbing contour 28b onto the longitudinal direction 18. In the exemplary embodiment, the offset length 70 amounts to 1.0 cm, for example, or 50% of the contour row spacing 68. In advantageous variants, the offset length 70 is between 10% and 40% of the contour row spacing 68, especially advantageously between 20% and 30%.

In the exemplary embodiment, each time four perturbing contours 28 of a plurality of perturbing contours 28 form a parallelogram 72.

The flexibly configured cover 14 in the exemplary embodiment is formed for example as a composite film. The flexibly configured cover 14 is materially bonded to the webs 46. In the exemplary embodiment, the materially bonded connection between the flexibly configured cover 14 and the frame 12 or the webs 46 is produced for example by a sealing process or a sealing method.

The invention claimed is:

1. A cooling plate (10) configured for temperature control of at least one battery cell, the cooling plate comprising:
   a frame (12) with a plurality of flow ducts (16) configured to have a coolant flow therethrough in a flow direction (26) extending from an inlet port (22) to an outlet port (24), and
   a flexible cover (14), which bounds the plurality of flow ducts (16) in a fluid-tight manner and which is configured to thermally contact the at least one battery cell,
   characterized in that one of the plurality of flow ducts (16) comprises a flow duct surface (17) and a plurality of perturbing contours (28) extending from the flow duct surface (17) and configured to increase turbulence in the coolant flowing through the one of the plurality of flow ducts (16),
   wherein the one of the plurality of flow ducts (16) is elongated in the flow direction (26),
   wherein the plurality of perturbing contours (28) each have an upper surface (29) facing the flexible cover (14) and facing opposite the flow direction (26) such that coolant flowing in the flow direction (26) is deflected by the upper surface (29),
   wherein the upper surface (29) defines:
      a contour height (30) relative to the flow duct surface (17), the contour height (30) being perpendicular to the flow direction (26) and increasing along the flow direction (26), and
      a lower edge (33) at a minimum contour height (30) where the upper surface (29) intersects the flow duct surface (17), the lower edge (33) being elongated in a width direction (19) perpendicular to the flow direction (26) and to the contour height (30), and wherein the upper surface (29) has, at the lower edge (33), a maximum width in the width direction (19),
   wherein a plurality of first perturbing contours (28a) of the plurality of perturbing contours (28) in the one of the plurality of flow ducts (16) are arranged in a first row along the flow direction (26) and a plurality of second perturbing contours (28b) of the plurality of perturbing contours (28) in the one of the plurality of flow ducts (16) are arranged in a second row along the flow direction (26), and
   wherein the plurality of second perturbing contours (28b) of the second row are offset from the plurality of first perturbing contours (28a) of the first row.

2. The cooling plate (10) according to claim 1, characterized in that each of the plurality of perturbing contours (28) deflects the coolant flowing through the flow duct (16) at least partly in a direction toward the flexible cover (14).

3. The cooling plate (10) according to claim 1, characterized in that each of the plurality of perturbing contours (28) has a triangular cross section area (38) parallel to the flow direction (26).

4. The cooling plate (10) according to claim 1, characterized in that each set of four perturbing contours (28) of the plurality of perturbing contours (28) form a parallelogram (72).

5. The cooling plate (10) according to claim 1, characterized in that the flexible cover (14) comprises at least one film.

6. The cooling plate (10) according to claim 1, characterized in that the flexible cover (14) comprises a plurality of films.

7. The cooling plate (10) according to claim 1, characterized in that the flexible cover (14) comprises a composite film.

8. The cooling plate (10) according to claim 1, characterized in that the flexible cover (14) is materially bonded to the frame (12).

9. The cooling plate (10) according to claim 1, characterized in that the frame (12) includes two webs (46) which border on each of the plurality of ducts (16) and to which the flexible cover (14) is materially bonded.

10. A battery system comprising a cooling plate (10) according to claim 1 and a battery module, wherein the battery module comprises at least one battery cell arranged on the flexible cover (14) so that a thermal contacting of the at least one battery cell and the flexible cover (14) is formed.

11. The cooling plate (10) according to claim 1, wherein the cooling plate (10) is formed from injection molding, and wherein the plurality of perturbing contours (28) are an extension of the frame (12).

12. The cooling plate (10) according to claim 1, wherein the flow duct surface (17) and the upper surfaces (29) are each planar, and wherein each of the lower edges (33) is linear.

13. The cooling plate (10) according to claim 1, wherein the flow duct surface (17) and the upper surfaces (29) are each planar, and wherein each of the upper surfaces (29) is at approximately a 45 degree angle to the flow duct surface (17).

14. The cooling plate (10) according to claim 1, wherein each of the plurality of perturbing contours (28) includes a rear surface extending between an upper edge (35) of the upper surface (29) and the flow duct surface (17), and wherein each of the rear surfaces is planar and is perpendicular to the flow direction (26).

15. The cooling plate (10) according to claim 1, wherein each of the upper surfaces (29) has an upper edge (35) that is elongated in the width direction (19).

16. A cooling plate (10) configured for temperature control of at least one battery cell, the cooling plate comprising:
   a frame (12) with a plurality of flow ducts (16) configured to have a coolant flow therethrough in a flow direction (26) extending from an inlet port (22) to an outlet port (24), and
   a flexible cover (14), which bounds the plurality of flow ducts (16) in a fluid-tight manner and which is configured to thermally contact the at least one battery cell, wherein each of the plurality of flow ducts (16) comprises a planar flow duct surface (17) and a plurality of perturbing contours (28) extending from the planar flow duct surface (17) and configured to increase turbulence in the coolant flowing through the plurality of flow ducts (16), wherein the plurality of flow ducts (16) are elongated in the flow direction (26), wherein each of the plurality of perturbing contours (28) has an upper planar surface (29) facing the flexible cover (14) and facing opposite the flow direction (26) such that coolant flowing in the flow direction (26) is deflected by the upper planar surface (29), side surfaces on opposite sides of the upper planar surface (29), the side surfaces extending between the upper planar surface (29) and the planar flow duct surface (17), wherein the side surfaces contact the planar flow duct surface (17) at side edges which are parallel to the flow direction (26), and a rear surface extending between the side surfaces and between the upper planar surface (29) and the planar flow duct surface (17), wherein the upper planar surface (29) forms an oblique angle with the planar flow duct surface (17) and the upper planar surface (29) defines a contour height (30) relative to the planar flow duct surface (17), the contour height (30) being perpendicular to the flow direction (26) and increasing along the flow direction (26), an upper edge (35) at a maximum contour height (30), the upper edge being linear and elongated in a width direction (19) perpendicular to the flow direction (26) and to the contour height (30), and a lower edge (33) at a minimum contour height (30) where the upper planar surface (29) intersects the planar flow duct surface (17), the lower edge (33) being elongated in the width direction (19), wherein the upper planar surface (29) has, at the lower edge (33), a maximum width in the width direction (19), wherein the side surfaces are perpendicular to the width direction (19), wherein the rear surface is perpendicular to the flow direction (26), wherein a plurality of first perturbing contours (28a) of the plurality of perturbing contours (28) in the one of the plurality of flow ducts (16) are arranged in a first row along the flow direction (26) and a plurality of second perturbing contours (28b) of the plurality of perturbing contours (28) in the one of the plurality of flow ducts (16) are arranged in a second row along the flow direction (26), and wherein the plurality of second perturbing contours (28b) of the second row are offset from the plurality of first perturbing contours (28a) of the first row.

17. The cooling plate (10) according to claim 16, wherein the planar upper surface (29) is at approximately a 45 degree angle to the planar flow duct surface (17).

\* \* \* \* \*